(12) United States Patent
Gretz

(10) Patent No.: US 7,307,212 B1
(45) Date of Patent: Dec. 11, 2007

(54) ELECTRICAL BOX ASSEMBLY WITH INTERNAL MOUNTING ARRANGEMENT AND FLANGE TO SEAL AGAINST AIR INFILTRATION

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/701,906

(22) Filed: Feb. 2, 2007

(51) Int. Cl.
*H01H 9/02* (2006.01)

(52) U.S. Cl. .................... 174/53; 174/58; 174/481; 174/50; 220/3.2; 220/3.3

(58) Field of Classification Search ............... 174/480, 174/481, 50, 53, 57, 58, 503, 500, 17 R; 220/3.2–3.9, 4.02; 439/535, 536, 537, 538; 248/906, 343
See application file for complete search history.

(56) References Cited

U.S. PATENT DOCUMENTS

| | | | | |
|---|---|---|---|---|
| 1,133,946 A | * | 3/1915 | Farrell ..................... | 220/3.4 |
| 3,633,782 A | * | 1/1972 | Bellinger ................. | 220/3.5 |
| 4,062,470 A | * | 12/1977 | Boteler .................... | 220/3.3 |
| 4,163,137 A | | 7/1979 | Close, Jr. | |
| 4,214,668 A | * | 7/1980 | Neff et al. ................ | 220/3.3 |
| 4,263,472 A | * | 4/1981 | Maheu ...................... | 174/51 |
| 4,293,173 A | | 10/1981 | Tricca | |
| 4,673,097 A | | 6/1987 | Schuldt | |
| 4,747,506 A | * | 5/1988 | Stuchlik, III ............... | 248/906 |
| 4,952,754 A | | 8/1990 | Rye | |
| 5,289,934 A | * | 3/1994 | Smith et al. ................ | 220/3.7 |
| 5,600,093 A | * | 2/1997 | Herth et al. ................ | 174/53 |
| 6,239,365 B1 | | 5/2001 | McEvers | |
| 6,756,541 B1 | * | 6/2004 | Mollick et al. ............. | 174/58 |
| 6,903,272 B2 | * | 6/2005 | Dinh ........................ | 174/58 |
| 6,956,169 B1 | * | 10/2005 | Shotey et al. ............... | 174/58 |
| 6,956,172 B2 | * | 10/2005 | Dinh ........................ | 174/58 |
| 6,979,780 B1 | * | 12/2005 | Lalancette ................. | 174/50 |
| 7,105,742 B1 | * | 9/2006 | Jolly ........................ | 174/50 |
| 7,214,875 B1 | * | 5/2007 | Gretz ....................... | 174/53 |

* cited by examiner

*Primary Examiner*—Angel R. Estrada

(57) ABSTRACT

An electrical box with sidewalls having a front edge and a flange extending transversely from the sidewalls at a set distance from the front edge. Knockouts in the sidewalls include multiple removable sections, which can be removed selectively as desired to create large or small openings for electrical cables. The sidewalls of the electrical box include an opening therein and a panel that can be inserted into the opening. The panel includes an internal mounting arrangement with captive fasteners for securing the electrical box to a stud. The flange provides a sealing surface for contacting the vapor barrier surrounding the box and thereby seals around the periphery of the electrical box. Duct seal is applied around the periphery of the cables at the knockout areas to provide an airtight seal for the electrical cables entering the electrical box.

19 Claims, 7 Drawing Sheets

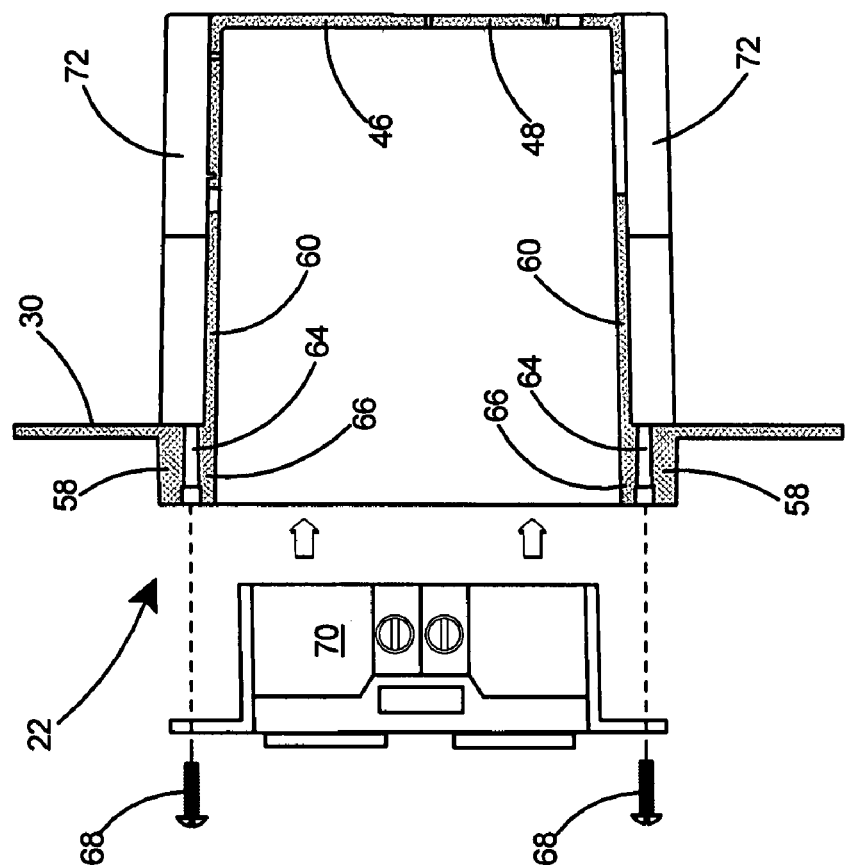
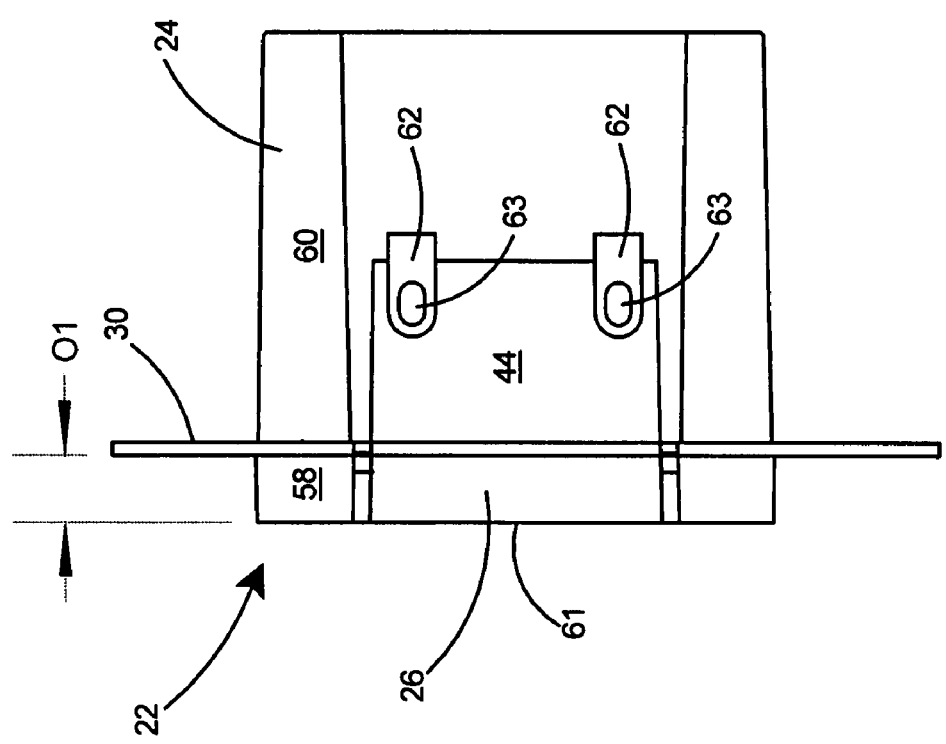
Fig. 4
Fig. 3

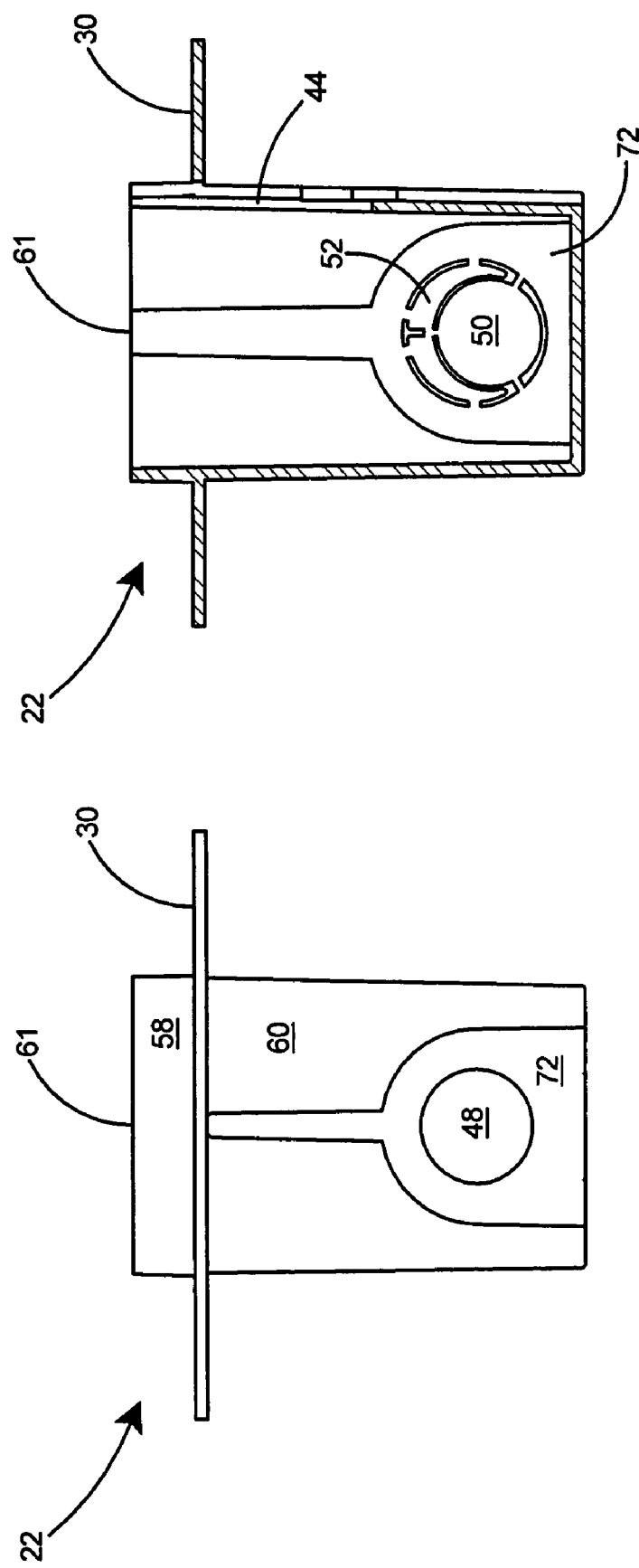

ELECTRICAL BOX ASSEMBLY WITH INTERNAL MOUNTING ARRANGEMENT AND FLANGE TO SEAL AGAINST AIR INFILTRATION

FIELD OF THE INVENTION

This invention relates to electrical boxes and specifically to an electrical box assembly including a peripheral flange to reduce air infiltration and an internal mounting arrangement for simplifying mounting to a stud.

BACKGROUND OF THE INVENTION

To achieve energy efficiency, a common goal in building construction, it is necessary to insulate and minimize air infiltration through walls. Typical wall construction to minimize air infiltration includes installing insulation between the studs and installing a vapor barrier, such as polyethylene, over the studs, and applying an interior wall covering such as sheetrock over the vapor barrier.

Unfortunately, the installation of conventional electrical boxes on the walls oftentimes compromises the air tightness of a building. Typically, electrical boxes are fastened to the studs and wiring pulled into the boxes prior to installation of the vapor barrier. The vapor and sheet rock are typically installed over the electrical boxes and holes then cut in the vapor barrier and sheetrock to expose the electrical boxes.

A couple of problems arise when holes are cut in the vapor barrier for conventional electrical boxes. Since the front edge of the electrical box extends to approximately level with the interior wall, the hole is typically cut larger than the periphery of the electrical box. With the hole larger than the electrical box, air seepage can occur around the periphery of the electrical box. The air seepage occurs as a result of the disruption of the integrity of the vapor barrier around the box and the inability of the conventional electrical box to create a proper seal with the vapor barrier.

A second source of air infiltration is through the conventional electrical box itself. This can occur as a result of oversized knockouts in the box and the lack of proper sealing materials around the electrical cables leading into the box.

Some manufacturers have attempted to solve the problem of air leakage through the box with multiple walls creating chambers into which foam can be inserted to surround incoming electrical cables. Although the foam can be sprayed into the chambers, it is difficult to control the amount of foam sprayed therein and the foam can frequently flow beyond the chambers and into the interior of the electrical box. Excess foam in the electrical box cavity can interfere with placement of an electrical device into the box. Additionally, with double-walled electrical boxes and the inherent problem of controlling the flow of the expanding foam, it is difficult to tell whether the foam has completely sealed around the cable entering the box or whether it has simply flowed into the internal cavity of the electrical box.

What is needed therefore is an electrical box that stops air infiltration around the periphery of the box and also enables proper sealing at the knockout areas wherein the electrical cables enter the box.

SUMMARY OF THE INVENTION

The invention is an electrical box with sidewalls having a front edge and a flange extending transversely from the sidewalls at a set distance from the front edge. Knockouts in the sidewalls include multiple removable sections, which can be removed selectively as desired to create large or small openings for electrical cables. The sidewalls of the electrical box include an opening therein and a panel that can be inserted into the opening. The panel includes an internal mounting arrangement with captive fasteners for securing the electrical box to a stud. The flange provides a sealing surface for contacting the vapor barrier surrounding the box and thereby seals around the periphery of the electrical box. Duct seal is applied around the periphery of the cables at the knockout areas to provide an airtight seal for the electrical cables entering the electrical box.

OBJECTS AND ADVANTAGES

A first advantage of the electrical box assembly of the present invention is that it provides an airtight electrical box installation. The electrical box assembly includes a transversely extending flange to seal around the outer periphery of the box. Adjustable knockouts in the sidewalls include multiple removable sections, which can be removed selectively as desired to create large or small openings for electrical cables and thereby minimize open areas and enable easier sealing around the cable openings.

Another advantage provided by the electrical box assembly of the present invention is that the mounting arrangement is integral with a separate insert portion of the electrical box rather than with the box itself. As a result, the fastener receptacles formed integral with the insert do not take up a great amount of usable volume within the box, as is the case with prior art boxes in which fastener receptacles are formed integral with the box. Prior art boxes are typically molded in one piece, with the fastener receptacles internal to the box. Molding a box in one piece eliminates a large amount of internal volume and makes it impossible to fit a large electrical component, such as a ground fault receptacle, within the resulting box. The two-piece electrical box assembly of the present invention provides a large internal volume with ample space for bulky devices such as ground fault receptacles.

A further advantage of the electrical box assembly of the present invention is that the internal mounting arrangement is located within the confines of the internal enclosure rather than behind the outward extending flange. Therefore the mounting arrangement is easily accessible by the installer and is not obscured by the flange.

Another significant advantage is that the electrical box assembly of the present invention does not include double wall construction. The box can therefore be easily molded of plastic.

These and other objects and advantages of the present invention will be better understood by reading the following description along with reference to the drawings.

DESCRIPTION OF THE DRAWINGS

FIG. 3 is a side view of the box member of FIG. 2.

FIG. 4 is a sectional view of the box member taken along line 4-4 of FIG. 2.

FIG. 5 is a top view of the box member of FIG. 2.

FIG. 6 is a sectional view of the box member taken along line 6-6 of FIG. 2.

TABLE OF NOMENCLATURE

Figure 1:
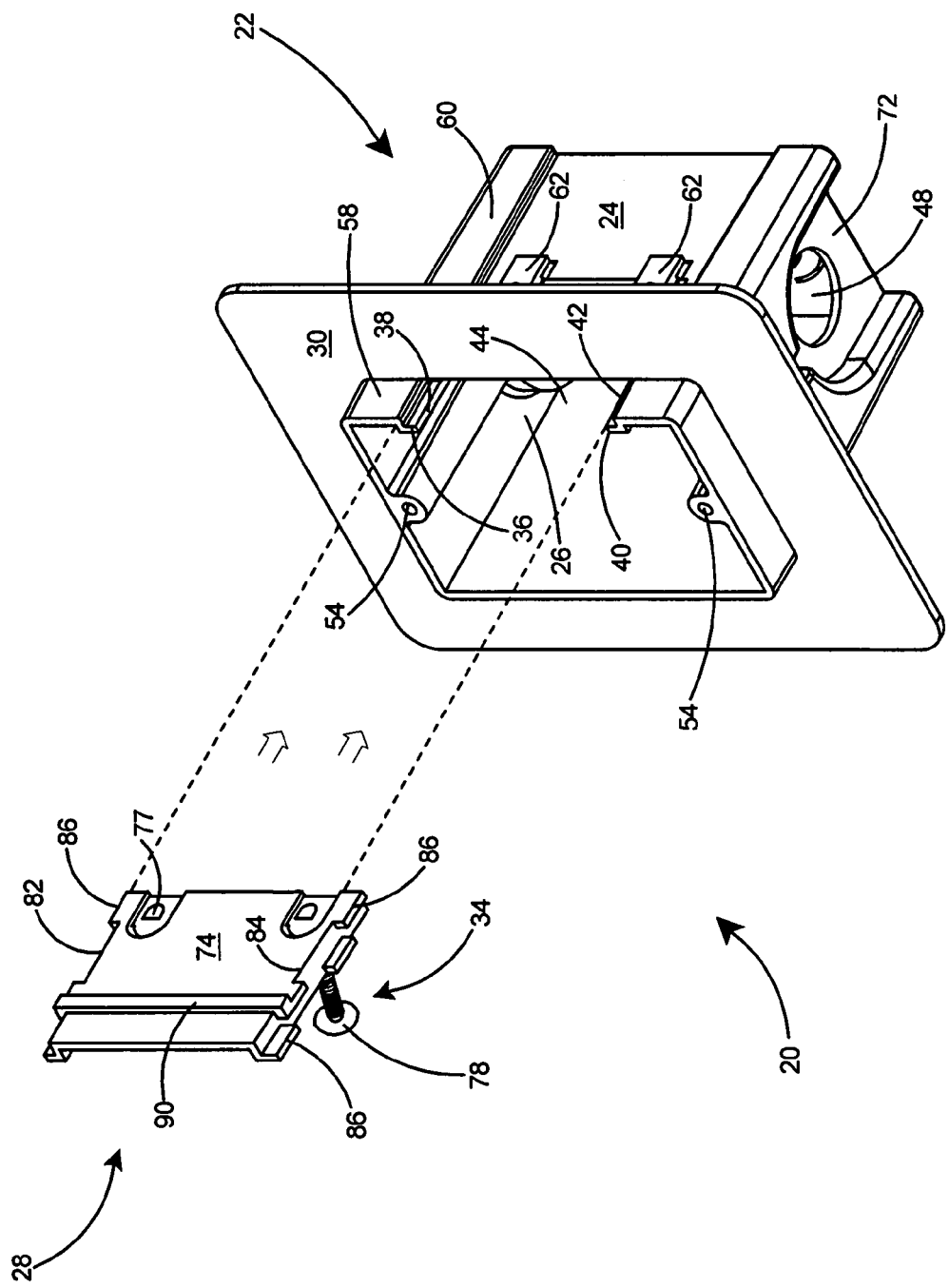
FIG. 1 is an exploded perspective view of a preferred embodiment of an electrical box assembly according to the present invention including a box member and a panel exploded away from the box and in alignment to be inserted therein.

The following is a listing of part numbers used in the drawings along with a brief description:

| Part Number | Description |
| --- | --- |
| 20 | electrical box assembly |
| 22 | box member |
| 24 | sidewalls |
| 26 | opening in sidewall |
| 28 | panel |
| 30 | flange |
| 32 | outer periphery of sidewalls |
| 34 | mounting arrangement |
| 36 | first rail |
| 38 | first edge |
| 40 | second rail |
| 42 | second edge |
| 44 | channel |
| 46 | back wall |
| 48 | knockout area |
| 50 | first removable wall portion |
| 52 | second removable wall portion |
| 54 | component contact points |
| 56 | enclosure |
| 58 | front sidewall portion |
| 60 | rear sidewall portion |
| 61 | front edge of box member |
| 62 | fastener guides |
| 63 | aperture |
| 64 | bore |
| 66 | boss |
| 68 | fastener for electrical device |
| 70 | electrical device |
| 72 | recessed area in sidewall |
| 74 | inside surface of panel |
| 76 | boss |
| 77 | bore |
| 78 | captive fastener |
| 80 | countersunk area |
| 82 | top edge of panel |
| 84 | bottom edge of panel |
| 86 | tab |
| 88 | outer surface of panel |
| 90 | rib |
| 92 | axis of captive fastener |
| 94 | head of captive fastener |
| 96 | screwdriver blade |
| 100 | stud |
| 102 | front edge of stud |
| 104 | electrical cable |
| 106 | duct seal |
| 107 | vapor barrier |
| 108 | sheetrock |
| 110 | wall surface |
| θ | angle of bore with respect to sidewall of box |
| D1 | distance of bore from the front edge of the box |
| O1 | offset distance of flange from front edge of box |

DETAILED DESCRIPTION OF THE INVENTION

With reference to a preferred embodiment in FIG. 1, the present invention is an electrical box assembly 20 for minimizing air infiltration when mounted on an interior wall of a structure. The electrical box assembly 20 includes a box member 22 including sidewalls 24, an opening 26 in one of the sidewalls 24, and a panel 28 that can be inserted and locked within the opening 26. The electrical box assembly includes a flange 30 extending outward transversely from the outer periphery 32 of the sidewalls 24 and a mounting arrangement 34 on the panel 28 for securing the box member 22 to a stud (not shown). The box member 22 includes a first rail 36 extending along a first edge 38 of the opening and a second rail 40 extending along a second edge 42 of the opening 26. The box member 22 includes a channel 44 formed between the rails 36 and 40 in the sidewall 24.

Figure 2:
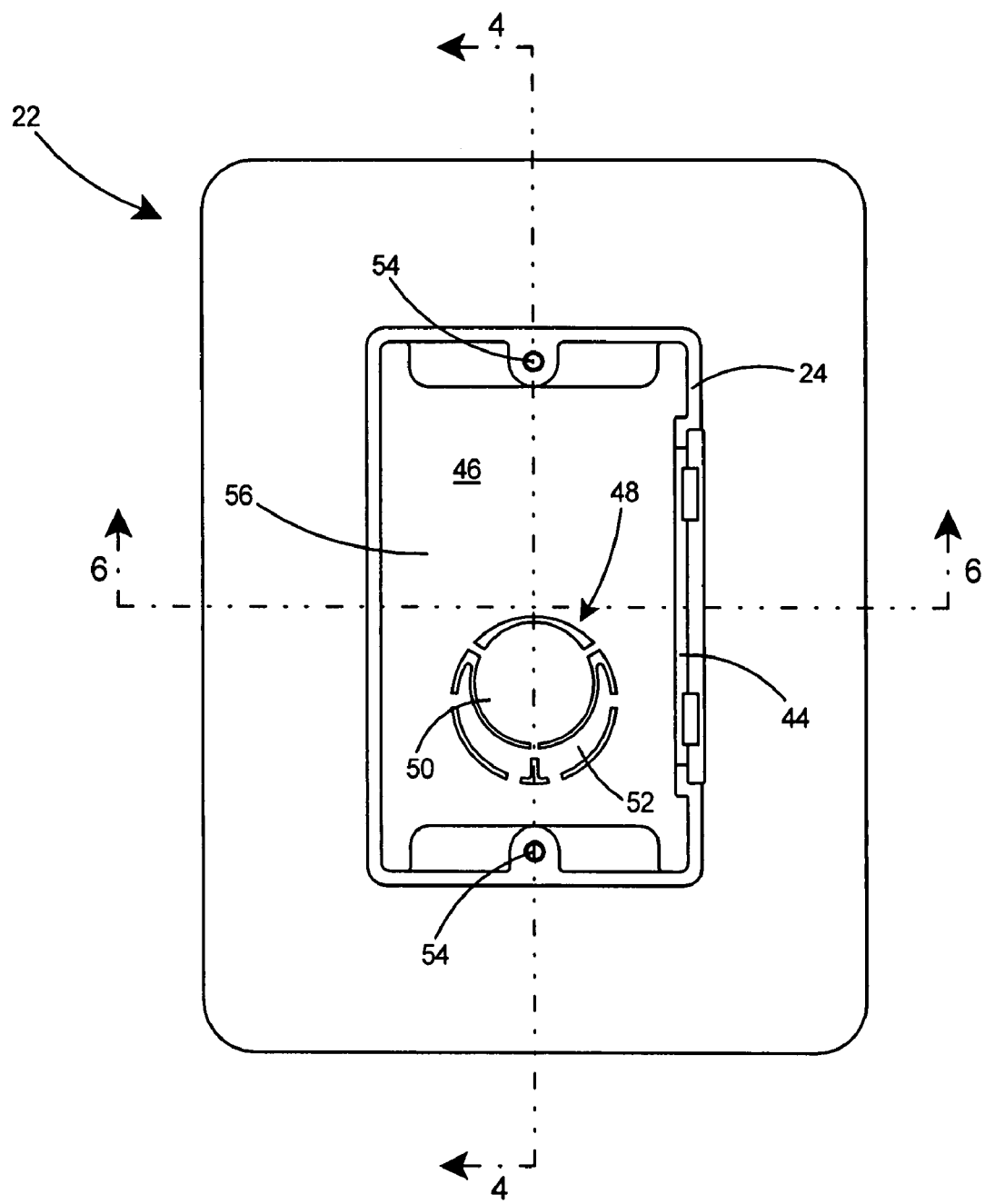
FIG. 2 is a front view of a preferred embodiment of the box member portion of the electrical box assembly of FIG. 1.

Referring to FIG. 2, the box member 22 includes a back wall 46 and a knockout area 48 in the back wall 46. The knockout area 48 includes a first removable wall portion 50 and a second removable wall portion 52 with the first removable wall portion 50 being of a smaller diameter than the second removable wall portion 52. The box member 22 further includes component contact points 54 extending from the sidewalls 24 into the enclosure 56 formed by the sidewalls 24 and back wall 46.

As shown in FIG. 3, the flange 30 divides the sidewalls 24 of the box member 22 into a front sidewall portion 58 and a rear sidewall portion 60. The flange 30 is offset from the front edge 61 of the box member 22 by a distance D1 that is substantially equal to the thickness of the sheetrock (not shown) that will be installed around the box member 22. The box member 22 further includes fastener guides 62 integral with the rear sidewall 60 and extending into opening 26. The fastener guides 62 include apertures 63 therein.

Referring to FIG. 4, the electrical component contact points 54 include bores 64 located in bosses 66 that are integral with the front sidewall portion 58 of the box member 22. The bores 64 are capable of receiving fasteners 68 of an electrical device 70 therein to secure the electrical device 70 to the box member 22.

With reference to FIG. 5, the box member 22 further includes a recessed area 72 in the rear sidewall portion 60. The recessed area includes a knockout area 48 that is capable of receiving a snap in connector (not shown) for locking an electrical cable with respect to the box, such as the Black Button™ electrical connector available from Arlington Industries, Inc. of Scranton, Pa.

Figure 7:
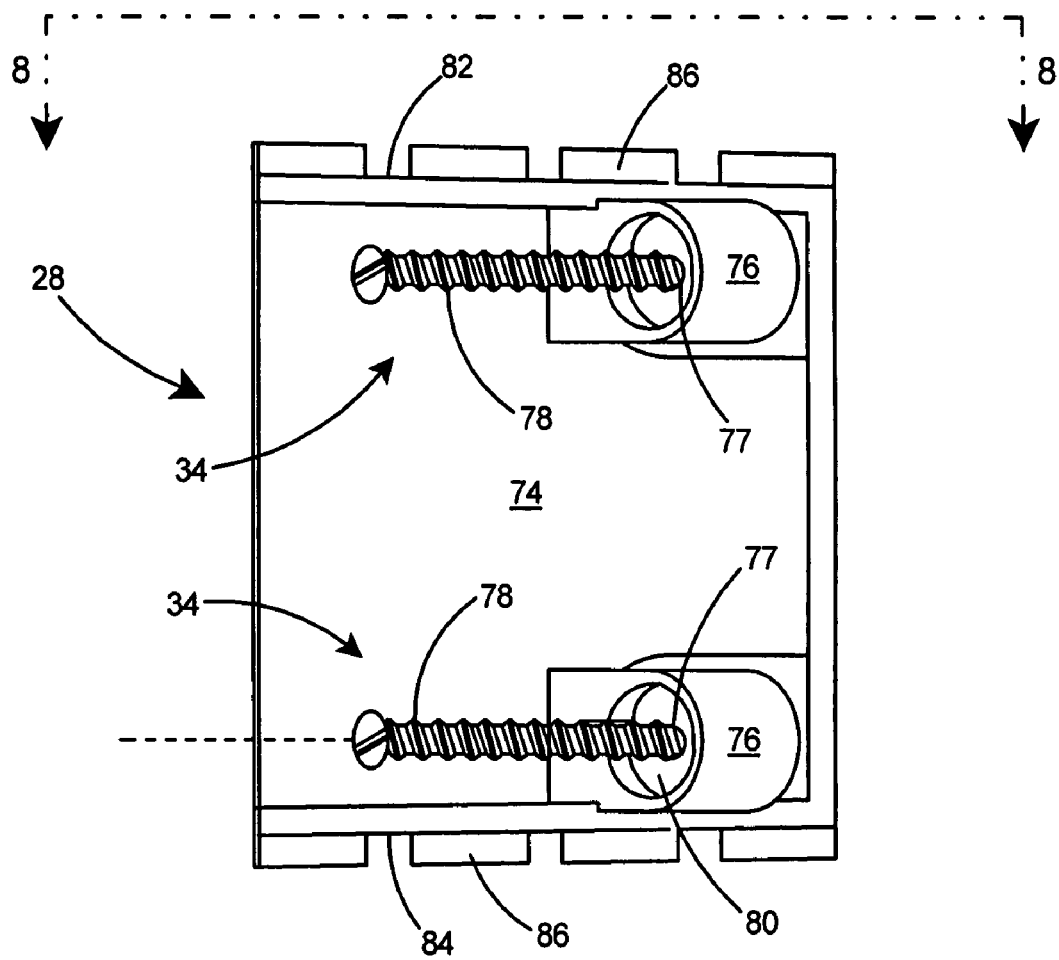
FIG. 7 is a side view of the panel portion of the electrical box assembly of FIG. 1 depicting the inside surface of the panel as it is inserted into the box member.
Figure 8:
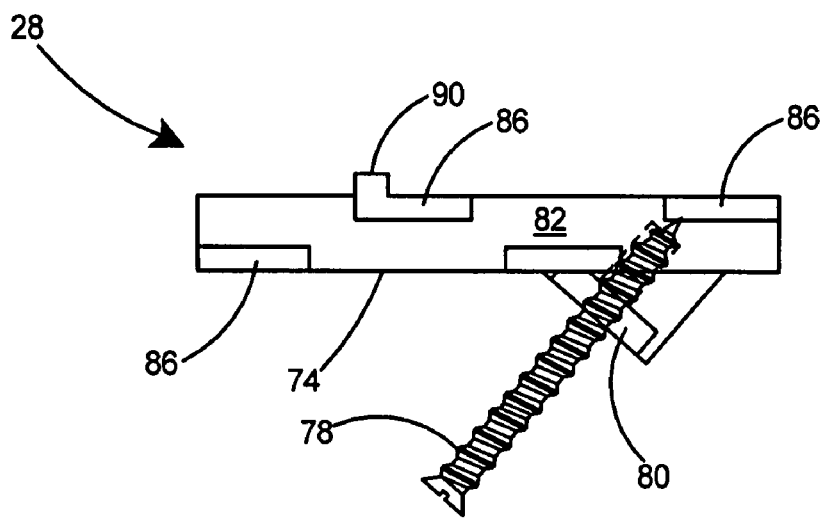
FIG. 8 is a top view of the panel taken along line 8-8 of FIG. 7.

Referring to FIGS. 7 and 8, there is shown a preferred embodiment of the panel 28 portion of the electrical box assembly of the present invention. The panel 28 includes an inside surface 74 and bosses 76 integral with the inside surface 74 and extending therefrom. The bosses 76 include bores 77 and captive fasteners 78 partially inserted in the bores 77 within the bosses 76 and frictionally held therein. The bosses 76 and captive fasteners 78 form the mounting arrangement 34 for securing the electrical box assembly 20 to a stud (not shown). To prevent any part of the captive fasteners 78 from contacting any wiring (not shown) within the electrical box, each boss 76 includes a countersunk area 80 thereby ensuring that no part of the fasteners 78 will extend from the bosses 76 after each fastener 78 is fully driven into a stud (not shown) when the mounting arrangement 34 is used to secure the electrical box assembly to a stud. The panel 28 includes a top edge 82, a bottom edge 84 and tabs 86 extending from the top edge 82 and bottom edge 84. The tabs 86 are arranged on each side of the panel 28 as shown in FIG. 8.

Figure 9:
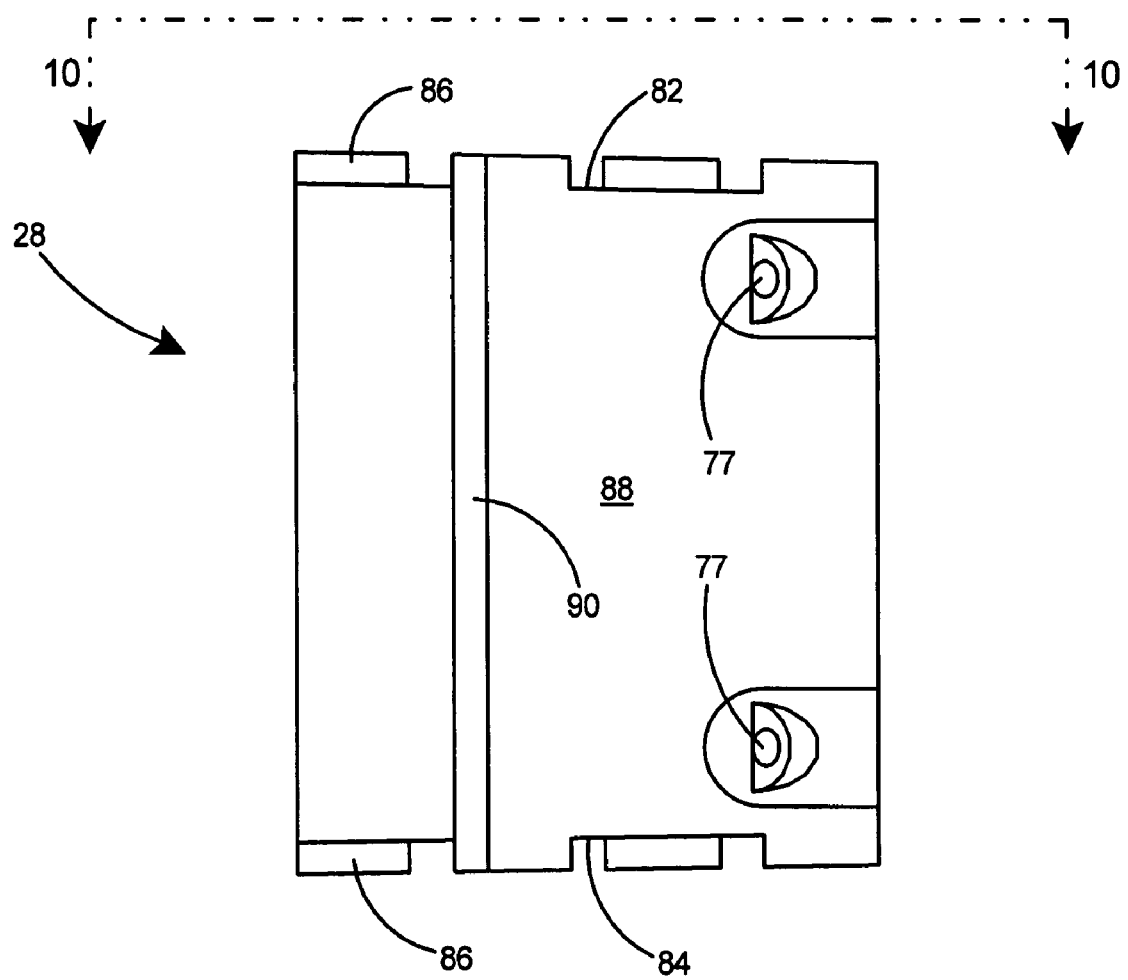
FIG. 9 is a side view of the panel portion of the electrical box assembly of FIG. 1 depicting the outside surface of the panel as it is inserted into the box member.
Figure 10:
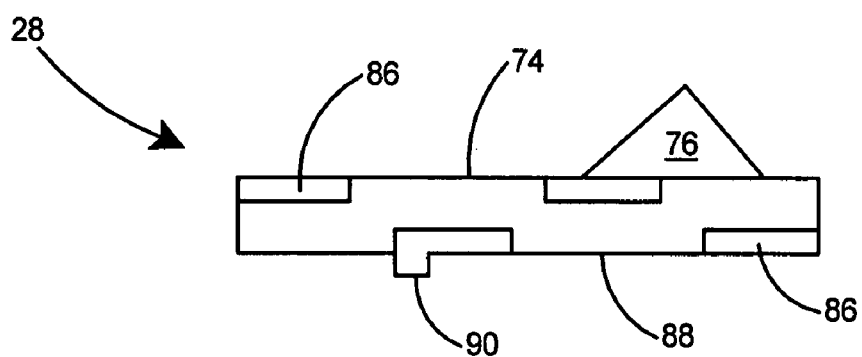
FIG. 10 is a top view of the panel taken along line 8-8 of FIG. 9.

As shown in FIGS. 9 and 10, the panel 28 further includes an outer surface 88 and a rib 90 extending from the top edge 82 to the bottom edge 84 along the outer surface 88.

As shown in FIG. 1, to form the electrical box assembly 20 of the present invention, the panel 28 is slid into the channel 44 in the sidewall opening 26 of the box member 22. The tabs 86 of the panel 28 engage the first and second rails 36 and 40 of the box member 22. The edges 82 and 84 of the panel 28 are received in the channel 44 of the box member 22.

Figure 11:
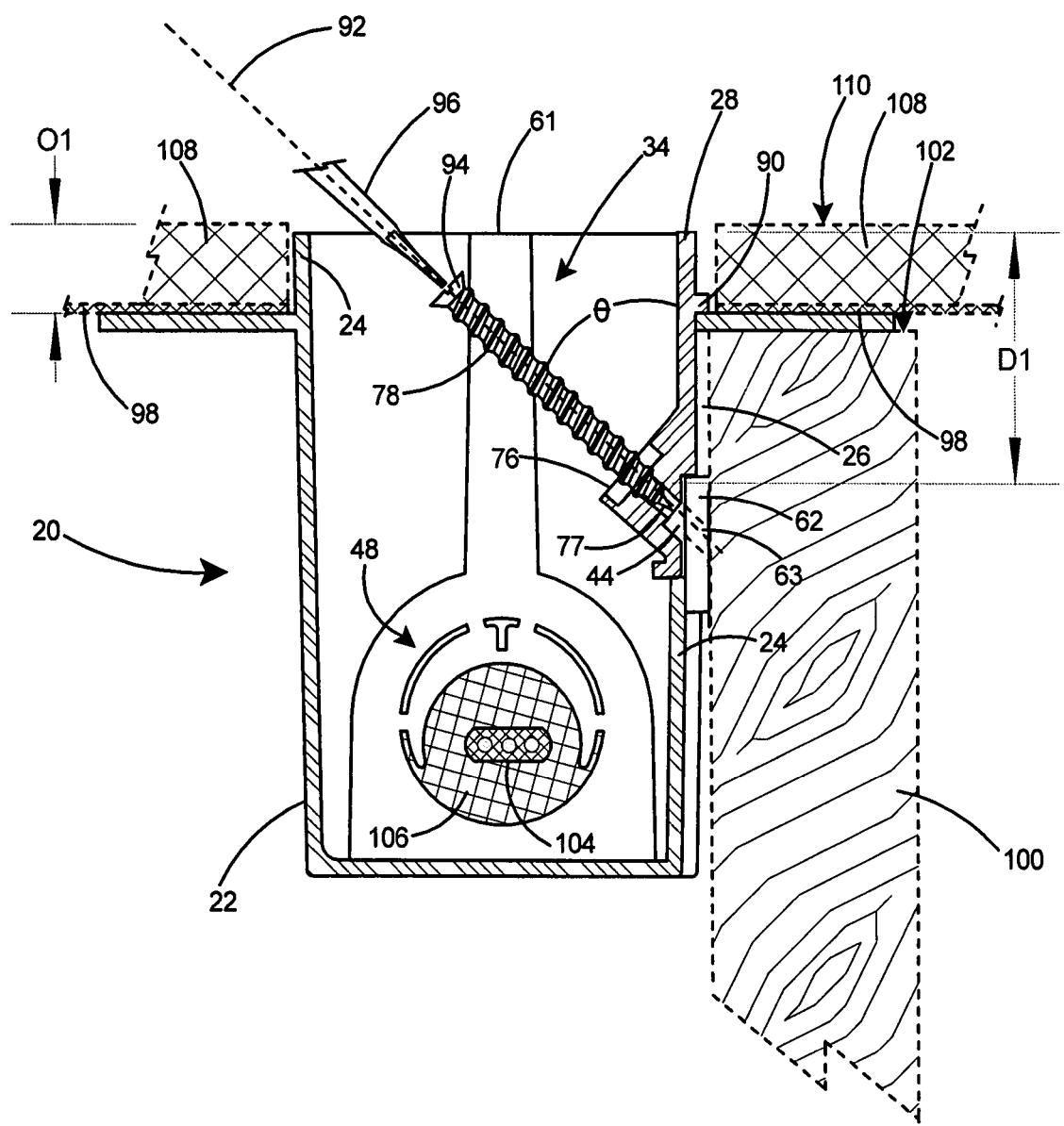
FIG. 11 is a sectional view of the electrical box assembly aligned against and in position to be mounted to a stud.

With reference to FIG. 11, the bore 77 in the panel 28 is at an angle θ with respect to the sidewall 24. The bore 77 is at a distance D1 from the front edge 61 of the box member 22. The angle θ with respect to the sidewall 24 and the distance D1 of the bore 77 from the front edge 61 of the box member 22 position the captive fastener 78 in such a manner that the axis 92 extending through the captive fastener 78 is clear of the sidewalls 24 and the front edge 61 of the box member 22. Therefore the head 94 of the captive fastener 78 is easily accessible by a tool such as a screwdriver blade 96 as shown. Preferably the angle θ of the bore 77 with respect to the sidewall 24 of the box member 22 is between 45 and 55 degrees. Most preferably, the angle θ of the bore 77 with respect to the sidewall 24 of the box member 22 is 50 degrees. When the panel 28 is fully inserted into the channel 44, the opening 26 in the sidewall 24 of the box member 22 is in alignment with the bores 77 of the bosses 76 on the panel 28.

The reader is referred to FIG. 11 for an understanding of the operation of the preferred embodiment of the electrical box assembly 20 of the present invention. The electrical box assembly 20 is provided with the panel 28 inserted in the channel 44 of the box member 22. The captive fastener 78 of the mounting arrangement 34, which extends through the aperture 63 of the fastener guide 62 on the panel 28, locks the panel 28 with respect to the box member 22.

As shown in FIG. 11, the electrical box assembly 20 is placed against stud 100, until flange 30 abuts the front edge 102 of the stud 100. The flange 30 enables the electrical box assembly 20 to be rapidly aligned with the front edge 102 of a stud 100. The captive fasteners 78 in the panel 28, one of which is in view in the figure, are then driven into the stud 100 to secure the electrical box assembly 20 to the stud 100. An installer can then remove either a small or large removable wall portion of the knockout area 48, depending on the size and number of electrical cables 104 required for the box 22, to provide electrical service to the box 22. Duct seal 106, available from Gardner Bender of Milwaukee, Wis., can be pressed around the periphery of the electrical cables 104 and the knockout area 48 to seal the electrical box against air infiltration. A vapor barrier 107, such as polyethylene, and sheetrock 108 are then installed in order around the periphery of the electrical box assembly 20. The sheetrock 108 presses the vapor barrier 107 against the front of the flange 30 and seals the vapor barrier against the flange 30. The offset O1 of the flange 30 from the front edge 61 of the electrical box 22 locates the front edge 61 substantially level with the wall surface 110.

The electrical box assembly 20 of the present invention, when installed as described hereinabove, meets the desired objective of providing an airtight electrical box installation. The electrical box assembly 20 includes a transversely extending flange 30 against which the vapor barrier 98 can be sealed. Adjustable knockout areas 48 in the sidewalls 24 include multiple removable sections 50 and 52, which can be removed selectively as desired to create large or small openings for electrical cables 104 and thereby minimize open areas and enable easier sealing around the cable openings.

By providing a mounting arrangement 34 that is integral with the panel 28, rather than integral with the box member 22, the electrical box assembly 20 of the present invention achieves the stated objective of maximizing the usable volume within the box. By providing an internal mounting arrangement 34 that is internal to the electrical box assembly 20, the mounting arrangement 34 is easily accessible by the installer and is not obscured by the flange 30, as is often the case with conventional electrical boxes.

A further objective of the present invention is obtained by providing an electrical box assembly with single wall rather than double wall construction. The single wall construction allows the electrical box to be molded of plastic. Preferably, the box member 22 and panel 28 are each molded in one piece of plastic. Plastics suitable for forming the box member and panel include polyvinyl chloride or polycarbonate.

Having thus described the invention with reference to a preferred embodiment, it is to be understood that the invention is not so limited by the description herein but is defined as follows by the appended claims.

What is claimed is:

1. An electrical box assembly comprising:
   a box member including sidewalls having an outer periphery;
   an opening in a first of said sidewalls of said box member;
   a panel secured in said opening, said panel including an inner surface;
   a first rail extending along a first edge of said opening;
   a second rail extending along a second edge of said opening;
   a channel in said box member formed between said rails and said sidewall including said opening;
   a flange extending outward transversely from said outer periphery of said sidewalls of said box member; and
   a mounting arrangement on said panel for securing said box member to a stud.

2. The electrical box assembly of claim 1 wherein said mounting arrangement includes
   a boss integral with and extending from said inner surface of said panel; and
   a captive fastener partially inserted and frictionally held within said boss.

3. The electrical box assembly of claim 2 wherein
   said boss includes a bore; and
   said bore in said panel is at an angle with respect to said sidewall.

4. The electrical box assembly of claim 3 wherein
   said box member includes a front edge;
   said bore includes a distance from said front edge of said box member;
   said bore in said boss is at an angle with respect to said sidewall of said box member; and
   said distance of said bore and said angle of said bore position said fastener clear of said sidewalls and said front edge of said box member.

5. The electrical box assembly of claim 3 wherein
   said opening is in transverse alignment with said bore of said panel; and
   said fastener of said mounting arrangement locks said panel to said box member when said fastener is advanced through said opening.

6. The electrical box assembly of claim 3 wherein said angle of said bore with respect to said sidewall of said box member is 50 degrees.

7. The electrical box assembly of claim 2 wherein said fastener frictionally held within said boss is completely contained within said enclosure;
said sidewalls of said box member include a front edge; and
said fastener does not extend beyond said front edge of said sidewalls of said box member.

8. The electrical box assembly of claim 1 wherein said panel includes edges and tabs extending from each of said edges.

9. The electrical box assembly of claim 8 wherein said edges of said panel are received in said channel of said box member.

10. The electrical box assembly of claim 9 wherein
said panel includes an inner surface and an outer surface; and
said panel includes a rib extending vertically along said outer surface.

11. The electrical box assembly of claim 10 wherein
said rib of said panel seats flush against said flange of said box member when said panel is seated within said channel; and
said rib forms a seal against said flange at said opening of said box member.

12. The electrical box assembly of claim 1 wherein said flange enables rapid alignment with the front edge of a framing member.

13. The electrical box assembly of claim 1 including
electrical component contact points extending from said sidewalls of said box member into said enclosure; and
said electrical component contact points capable of receiving fasteners of an electrical device therein.

14. The electrical box assembly of claim 1 wherein
said box member includes a back wall; and
a removable wall portion in said back wall of said box member.

15. The electrical box assembly of claim 1 wherein
said removable wall portion in said back wall includes a first removable wall portion and a second removable wall portion; and
said first removable wall portion is of a smaller diameter than said second removable wall portion.

16. The electrical box assembly of claim 1 including
a pair of rails extending along opposite sides of said opening in said first sidewall;
a channel in said box member formed between said rails and said first sidewall; and
said tabs guiding said panel toward frictional engagement with said channel of said box member.

17. The electrical box assembly of claim 1 wherein said box member is of single wall construction.

18. An electrical box assembly comprising:
a box member including sidewalls having an outer periphery;
an opening in a first of said sidewalls of said box member;
a panel secured in said opening, said panel including an inner surface;
a flange extending outward transversely from said outer periphery of said sidewalls of said box member;
a mounting arrangement on said panel for securing said box member to a stud;
a boss integral with and extending from said inner surface of said panel;
a captive fastener partially inserted and frictionally held within said boss;
said boss includes a bore;
said bore in said panel is at an angle with respect to said sidewall; and
said angle of said bore with respect to said sidewall of said box member is between 45 and 55 degrees.

19. An electrical box assembly comprising:
a box member including sidewalls defining an enclosure;
an opening in a first of said sidewalls of said box member, said first sidewall including an inner surface;
a panel secured against said inner surface of said first sidewall of said box member in alignment with said opening, said panel including two sides;
tabs extending outward from each side of said panel;
a captive fastener frictionally held in said panel, said fastener including a central axis; and
said central axis of said fastener in alignment with said opening in said first sidewall whereby tightening of said fastener secures said panel to said box member and said box member to a framing member.

* * * * *